United States Patent [19]

Kuizenga

[11] Patent Number: 5,025,446
[45] Date of Patent: * Jun. 18, 1991

[54] INTRA-CAVITY BEAM RELAY FOR OPTICAL HARMONIC GENERATION

[75] Inventor: Dirk J. Kuizenga, Sunnyvale, Calif.

[73] Assignee: Laserscope, San Jose, Calif.

[ * ] Notice: The portion of the term of this patent subsequent to Mar. 6, 2007 has been disclaimed.

[21] Appl. No.: 300,389

[22] Filed: Jan. 23, 1989

Related U.S. Application Data

[63] Continuation-in-part of Ser. No. 176,810, Apr. 1, 1988, abandoned.

[51] Int. Cl.$^5$ .................................................. H01S 3/10
[52] U.S. Cl. ........................................ 372/21; 372/22; 372/101; 307/427
[58] Field of Search .................... 372/9, 21, 22, 101; 307/427

[56] References Cited

U.S. PATENT DOCUMENTS

4,158,176  6/1979  Hunt et al. ........................ 372/101
4,637,026  1/1987  Liu ................................... 307/427

Primary Examiner—Georgia Epps
Attorney, Agent, or Firm—Skjerven, Morrill, MacPherson, Franklin & Friel

[57] ABSTRACT

Intra-cavity generation of second and higher harmonic frequency laser radiation is improved by inclusion of a lens or multiple-lens arrangement that focuses electromagnetic radiation emitted by the active laser medium on a wavelength conversion means within the cavity or on removal means to remove the second or higher harmonic radiation from the cavity.

24 Claims, 11 Drawing Sheets

INTRA-CAVITY BEAM RELAY FOR OPTICAL HARMONIC GENERATION

RELATED APPLICATION

This application is a continuation-in-part of my application for patent Ser. No. 07/176,810 filed Apr. 1, 1988, abandoned, having the same title and assigned to Laserscope the assignee of this application.

BACKGROUND—FIELD OF THE INVENTION

This invention relates to laser resonators and efficient, high average power optical harmonic generation, and more specifically to an improved method and structure to determine and control the diameter of the laser beam in the nonlinear medium.

BACKGROUND—DISCUSSION OF PRIOR ART

Optical second harmonic generation (SHG) was first demonstrated with the output beam of a ruby laser at 694.0 nm and using crystalline quartz as a nonlinear crystal to generate a wavelength of 347.0 nm. This was published by Franken, Hill, Peters and Weinreich in Phys. Rev. Letters 7, p. 118 (1961). Because of the nonlinear nature of the SHG process, the efficiency of SHG improves as the power density of the fundamental wavelength light is increased, and one way to do this is to put the nonlinear crystal inside the laser resonator. The theory of intra-cavity SHG has been discussed by R.G. Smith in JQE QE-6, pp. 215-226 (1970) and many others. To further increase the power density of the fundamental wavelength light, the light is focused in the nonlinear crystal inside the laser resonator, and the laser is Q-switched or mode-locked. This is very well reviewed in a recent book by W. Koechner, *Solid-State Laser Engineering*, Springer-Verlag, 1988, Second Edition, pp. 477-518.

For any particular laser apparatus, such as a Nd:YAG laser with a intra-cavity KTP crystal and a Q-switch, there usually is a beam diameter in the nonlinear crystal that will optimize the SHG output. Generally speaking, it is the ratio of the beam diameters in the laser rod and the nonlinear crystal that will optimize the process. To determine the beam diameter in the nonlinear crystal requires careful design of the laser resonator and will depend on the radii of curvature of the resonator mirrors, any intra-cavity focusing elements and the relative position of these elements.

Such a cavity design is discussed by W. Culshaw, J. Kanneland and J. E. Peterson in JQE, QE-10, pp. 253-262 (1974). Where this design becomes very difficult is when one of the focusing elements in the laser became pump power dependent. This is particularly the case in solid-state lasers such as Nd:YAG. The pump light heats the rod nearly uniformly, but due to the water cooling on the outside diameter of the rod, a temperature gradient results in the rod that causes thermal focusing in the laser rod. This is described in detail by W. Koechner in Applied Optics, 9, pp. 1429-1434 and pp. 2568-2553 (1970). This thermal focusing can be quite severe, and in high average power solid-state lasers like Nd:YAG, can completely dominate the criteria for stability of the laser resonator.

Under these conditions of a pump power dependent lens in the resonator, it is particularly difficult to control the ratio of the diameters of the beams in the laser rod and the nonlinear crystal and under certain circumstances the beam diameter in the nonlinear crystal can become quite small and the surface or bulk of the nonlinear crystal can be damaged due to the high peak power density of the fundamental wavelength beam. This is a particularly severe problem in the Q-switched laser where the high peak power at the peak of the Q-switched pulse can damage the nonlinear crystal. A high average power laser system producing more than 20 W output power at 532 nm is described by P.E. Perkins and T.S. Fahlen in JOSA, 4, pp. 1066-1071 (1987), but when such a system was put into production in a medical system for laser surgery, the reliability of this system was poor because of optical damage to the nonlinear KTP crystal.

What is required is an imaging system that can take the beam diameter from the laser rod and image it into the nonlinear crystal such that the ratio of the two diameters are fixed by the properties of the imaging system only. Such an imaging actually exists and is described by J.T. Hunt, J.A. Glaze, W.W. Simmons and P. A. Renard in Applied Optics, 17, pp. 2053-2057 (1978). This imaging system, called an optical relay, consist of two lenses with focal lengths $F_1$ and $F_2$ with the lenses spaced by the sum of the focal lengths. Two image planes exist such that the image in one plane is reproduced exactly in the second plane, both in amplitude and phase but with the image reduced or enlarged by the ratio of the focal lengths. It is this unique property of the two lens relay to propagate a beam profile and reproduce it in amplitude and phase that I will use to solve the problem to control the beam diameter in a nonlinear crystal.

The prior state of the art is also well defined in previous patents. U.S. Pat. No. 3,975,693 by J.D. Barry (Aug. 17, 1976) describes an apparatus for generating a beam at 1064 nm and the second harmonic at 532 nm. Barry shows an internal lens in the resonator, but does not actually claim it as an invention. The single internal lens can at that stage already be considered prior state of the art. Other patents describe various improvement to increase and stabilize the SHG output, as follows: U.S. Pat. No. 4,127,827 by J. D. Barry (Nov. 28, 1978), 4,413,342 by M. G. Cohen and K. C. Liu (Nov. 1, 1983), 4,617,666 by K. C. Liu (Oct. 4, 1986), and 4,637,026 by K. C. Liu (Jan. 13, 1987). The only claims in these patents that are related to the resonator structure of the laser, are in the last two patents by K. C. Liu and consist of using a curved mirror both for focusing into the nonlinear crystal and providing a means of output coupling for the SHG beam.

The optical relay is described in a U.S. Pat. No. 4,158,176 by J. T. Hunt and F. A. Renard (June 12, 1979). This patent describes the relay in the use of successive amplifier, but does not describe an optical relay inside a laser resonator for spotsize control.

OBJECTS AND ADVANTAGES

Among objects of my invention are:
1. Determine the ratio of the beam diameters in the laser median and nonlinear crystal to optimize the SHG process and obtain the maximum SHG output or to obtain a compromise between increasing the SHG output and minimizing the threat of damage to the nonlinear crystal.
2. Control the beam diameter in the nonlinear crystal and make it independent of the thermal focusing in the laser rod and radii of curvature of the resonator mirrors.

3. Prevent the formation of local high amplitude areas or hot spots in the beam in the nonlinear crystal.

4. Control the environment around the nonlinear crystal and avoid heating of the nonlinear crystal due to stray laser beams near the nonlinear crystal.

The advantages of this invention will be to easily optimize the SHG output from a laser and yet minimize the probability of damage to the nonlinear crystal.

DRAWING REFERENCE NUMERALS

For convenience in referring to the drawings, the numerals in the drawings refer to elements as defined below:
10: first resonator mirror
12: second resonator mirror
14: laser rod
16: optical pump
18: nonlinear crystal (NLC) for second harmonic generation (SHG)
20: Q-switch
22: mirror and means of output coupling for SHG
24: laser beam inside optical resonator
26: SHG beam inside optical resonator
28: SHG beam outside optical resonator
30: intra-cavity lens
32: focusing mirror and means of output coupling for SHG
33: angle of incidence on the focusing mirror
34a : first relay lens
34b : first relay mirror
36a : second relay lens
36b : second relay mirror
38: first relay plane
40: second relay plane
42: beam diameter at first relay plane
44: beam diameter at second relay plane
46: SHG beam output through first relay mirror
48: SHG beam output through second relay mirror
50: curve of beam diameter in nonlinear crystal vs back focal length of laser rod (BFL) for resonator with single lens
52: curve of mode multiplier vs BFL for resonator with single lens
54: curve of beam diameter in nonlinear crystal vs BFL for resonator with optical relay
56: curve of mode multiplier vs BFL for resonator with optical relay
58: lens
60: first conjugate plane of 58
62: second conjugate plane of 58
64: curve of beam diameter in nonlinear crystal vs BFL for resonator with laser rod and nonlinear crystal on conjugate planes of single lens
66: curve of mode multiplier vs BFL for resonator with components on conjugate planes of single lens
68: stray beam reflected of nonlinear crystal

DETAILED DESCRIPTION

Figure 1:
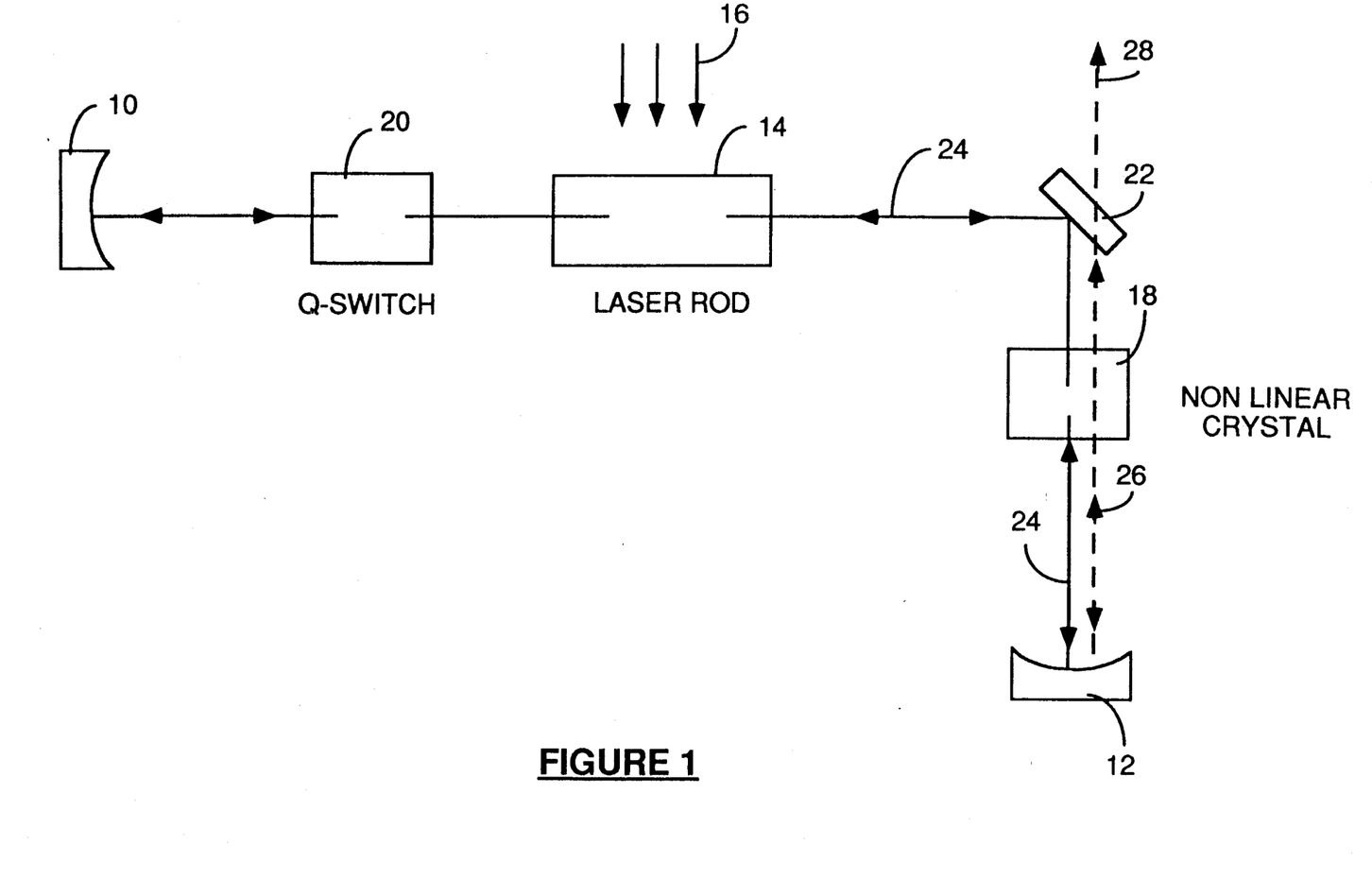
FIG. 1 is a schematic of a laser apparatus for SHG with a folded resonator for output coupling of the second harmonic.

A typical prior art laser apparatus for intra-cavity second harmonic generation (SHG) is shown in FIG. 1. The laser resonator consist of a first resonator mirror 10 and a second resonator mirror 12. Inside the resonator is a laser rod 14 such as a Nd:YAG laser rod that is pumped by an optical pump source 16 such as a Kr arc lamp. Inside the resonator is also nonlinear crystal 18 for SHG and a folding mirror 22. A laser beam inside the optical resonator 24 bounces back and forth between first and second resonator mirrors 10 and 12, reflecting off folding mirror 22 and propagates through the laser rod 14 and nonlinear crystal 18. The laser rod 14 has optical gain at a certain wavelength and this determines the wavelength of the laser beam inside the resonator 24. This wavelength is also referred to as the fundamental wavelength. When this laserbeam inside the resonator 24 propagates through the nonlinear crystal 18 in a direction away from the folding mirror 22 and toward the second resonator mirror 12, a beam of electromagnetic radiation at the second harmonic wavelength 26 is generated. The second resonator mirror 12 is highly reflecting at both the fundamental and second harmonic wavelengths and both beams propagate back through the nonlinear crystal 18. On this second pass, more SHG is produced. The folding mirror 22 is highly reflecting at the fundamental wavelength and is highly transmitting at the second harmonic wavelength and hence the SHG beam passes through the folding mirror 22 and produces a SHG beam outside the optical resonator 28. This folding mirror 22, provides a means of output coupling for the SHG. The laser beam inside the resonator 24 at the fundamental wavelength continues through the laser rod 14 and reflects off the first resonator mirror 10 which is highly reflecting at the fundamental wavelength. It is possible to add a Q-switch 20 to the laser apparatus in FIG. 1. This Q-switch changes the laser beam inside the resonator 24 to a train of short pulses with high peak power. These short pulses in turn increase the efficiency of the SHG and increase the average power in the SHG beam outside the resonator 28.

The laser beam inside the resonator 24 has a beam diameter $D_2$ in the laser rod 14 and a beam diameter $D_1$ in the nonlinear crystal 18. For a given laser rod, such as Nd:YAG and a nonlinear crystal such as KTP, the efficiency of the SHG depends on the ratio of the diameter of the beams $D_2/D_1$. When the laser is Q-switched, the ratio $D_2/D_1$ to optimize the SHG is larger than from the cw case. In the resonator shown in FIG. 1, this ratio $D_2/D_1$ depends on the radii of curvature $R_1$ and $R_2$ of the first and second resonator mirrors 10 and 12 respectively, as well as the total distance between these mirrors and the placement of the laser rod 14 and nonlinear crystal 18 within the resonator. It can be shown that in this resonator, it is difficult to make this ratio $D_2/D_1$ substantially larger that one, i.e., it is difficult to make the beam diameter in the nonlinear crystal much smaller than the beam diameter in the laser rod.

What makes it more difficult to control the ratio of the beam diameters, is that the laser rod can act like a lens inside the resonator. The laser rod 14 is pumped nearly uniformly by the pump source 16 and is consequently heated nearly uniformly through the volume of the laser rod. The laser rod is cooled with water along the outside diameter of the rod and this causes a thermal gradient from the center of the rod towards the edge, with the maximum temperature in the rod at the center. In index of refraction of the laser rod is typically temperature dependent, causing a higher index of refraction at the rod center than at the edge. Consequently, the laser rod becomes a lens, and the focal length of this lens, referred to as "a thermal lens," becomes dependent on the optical pump power to the laser rod, and hence, also the output power from the laser. It is under these circumstances that it is very difficult to control the ratio of beam diameters in the laser rod and nonlinear crystal in a resonator shown in FIG. 1, particularly if this ratio has to be much larger than one, to obtain a small spot-size in the nonlinear crystal.

Figure 2:
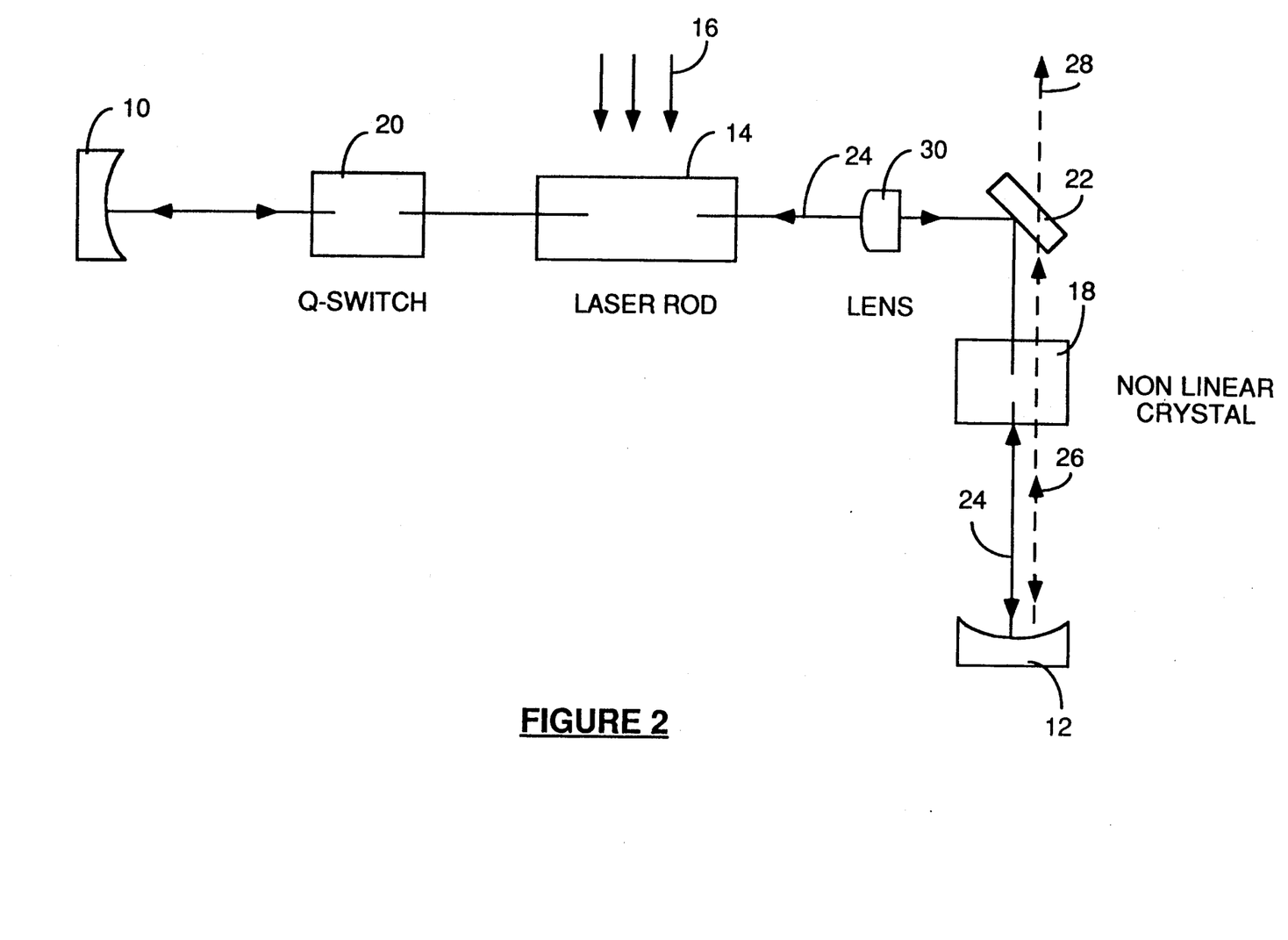
FIG. 2 is a schematic of a laser apparatus for SHG with an internal lens to focus the beam in the nonlinear crystal and a folded resonator for output coupling of the second harmonic.

For a typical laser rod such as Nd:YAG and nonlinear crystal such as KTP, the spotsize in the KTP has to be smaller than in the ND:YAG to optimize the SHG output power even when the laser is Q-switched. An apparatus to do this is shown in FIG. 2. Here an intra-cavity lens 30 is added. Generally, the lens is positioned such that the distance between the nonlinear crystal 18 is approximately equal to the focal length of the lens. In this arrangement, the laser beam, coming out of the laser rod 14 is focused into the nonlinear crystal and produces a small beam diameter in the nonlinear crystal 18. This intra-cavity lens 30 also helps to control the problems associated with the thermal focusing of the laser rod 14. As long as the focusing of the intra-cavity lens 30 is much stronger than the thermal focusing of the laser rod 14, the beam diameters in the resonator do not strongly depend on the thermal focal length. However, in practical lasers, the focal lengths of the intra-cavity lens and the thermal lens can become comparable, and the control of the beam diameters in the nonlinear crystal 18 now becomes very difficult.

Figure 3:
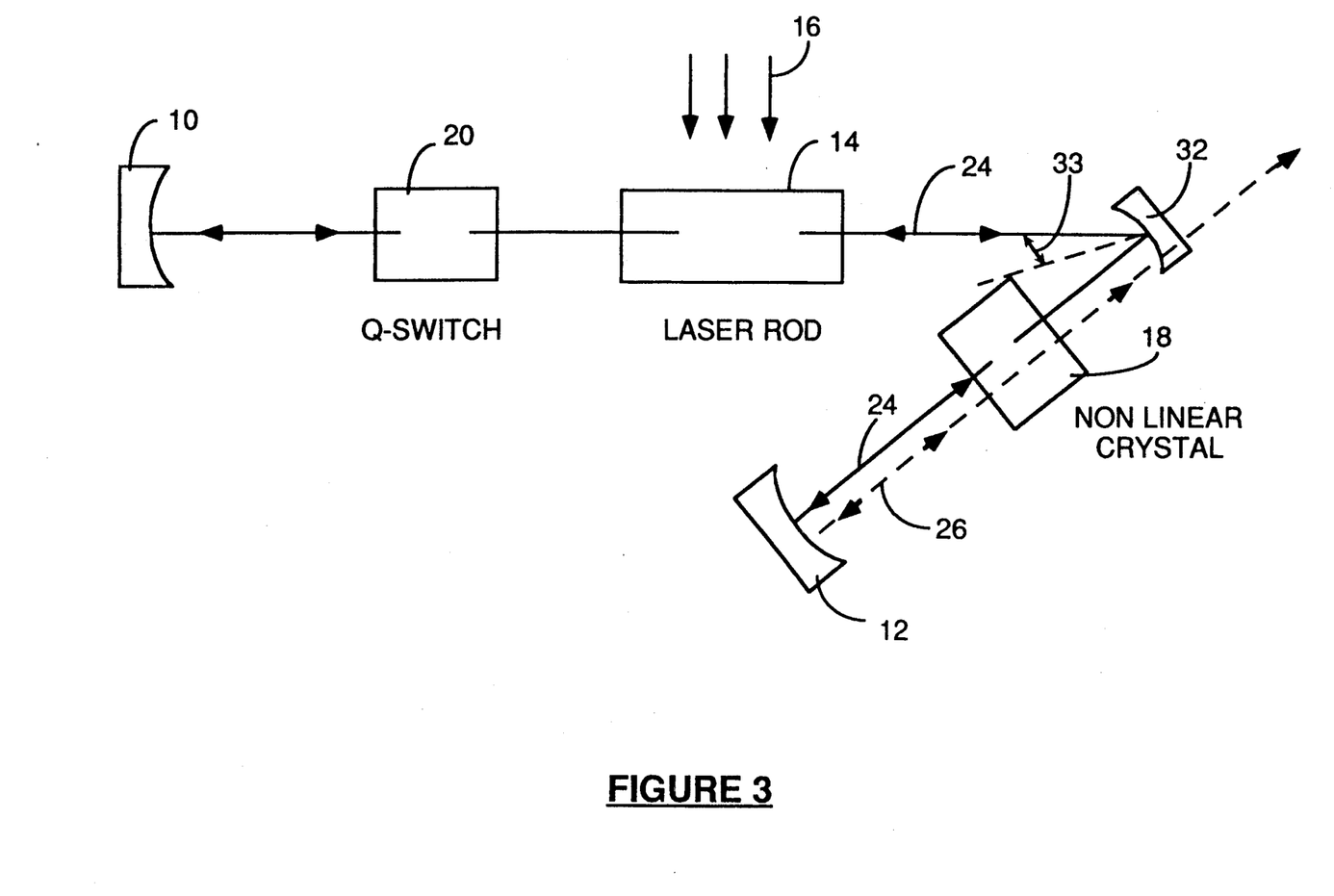
FIG. 3 is the same as FIG. 2 but with a curved mirror to replace the lens and also provide output coupling for the second harmonic.

FIG. 3 shows a laser apparatus similar to that in FIG. 2, where the intra-cavity lens 30 is replaced by a curved mirror 32. This focusing mirror now also acts as a means of output coupling for the SHG and replaces the folding mirror 22 in FIG. 2. The radius of curvature RJ of the focusing mirror 32 is equal to twice the focal length of the intra-cavity lens 30. To minimize astigmatism in the resonator, the angle of incidence 33 of the beam on the focusing mirror 32 is kept small. In practice, if the angle of incidence 33 is less than 10 degrees, astigmatism is negligible.

Figure 4:
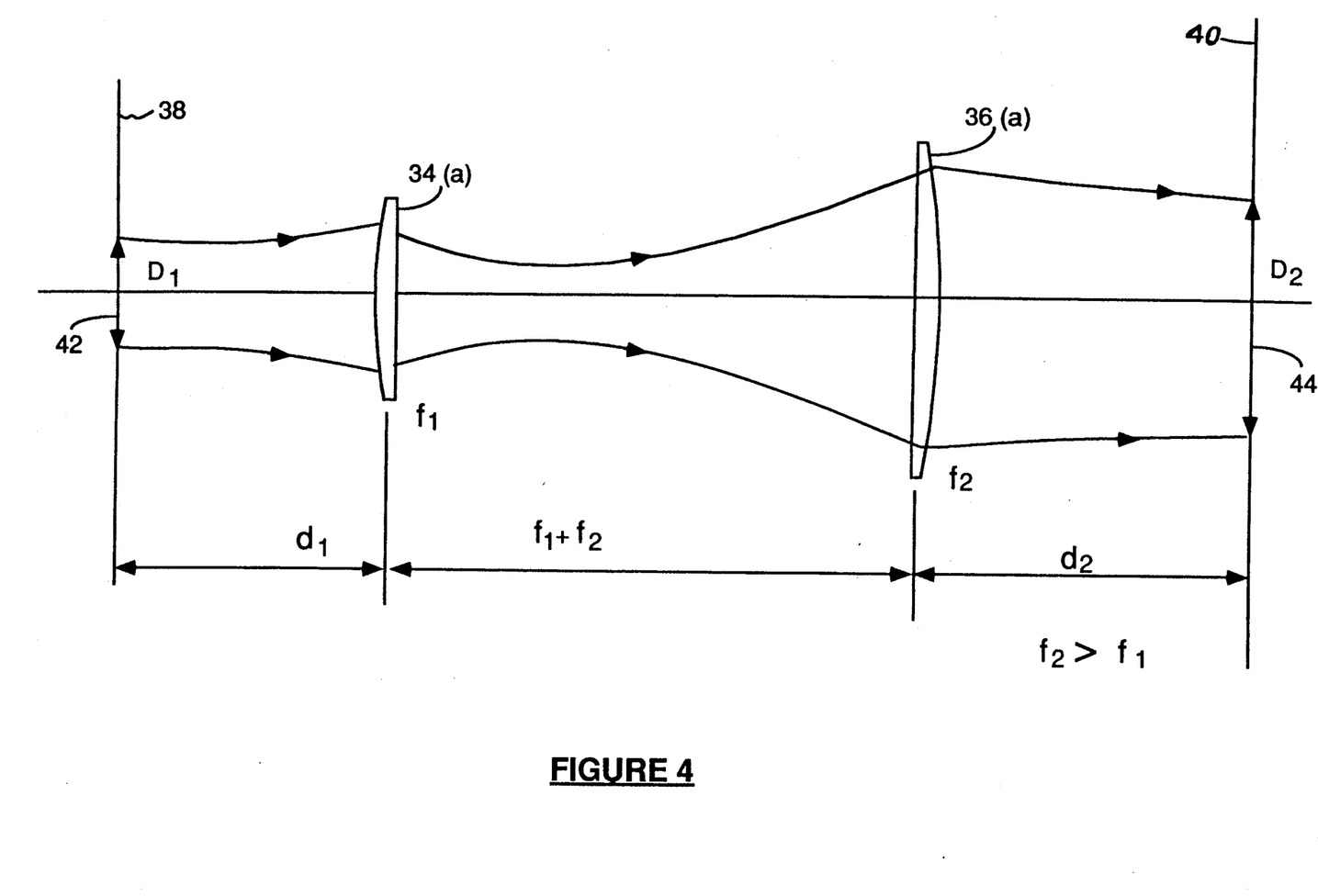
FIG. 4 is a schematic of the focusing properties of a two lens relay.

In the laser apparatus described above in FIGS. 2 and 3, it is difficult to control the diameter of the laser beam in the nonlinear crystal as the thermal focal length of the laser rod 14 changes. To solve this problem, we will use an optical relay shown in FIG. 4. An optical relay consists of two lenses, the first relay lens 34(a) with focal length $f_2$ and the second relay lens 36(a) with a focal length $f_1$. These two relay lenses are separated by the sum of their focal lengths. The magnification of this optical relay is defined as m, where $m = f_2/f_1$ It can be shown that this optical relay has two relay planes. The first relay plane 38 is a distance $d_1$ from the first relay lens 34(a) and the second relay plane 40 is distance $d_2$ from the second relay lens 36(a), as shown in FIG. 4. These positions of the relay planes are related by $m\, d_1 + d_2/m = f_1 + f_2$ If all the above conditions are satisfied, then it can be shown that any light distribution at the first relay plane 38 is exactly reproduced at the second relay plane 40 magnified by the m, the magnification. Note particularly that an image at the first relay plane 38 is reproduced at the second relay plane 40 both in amplitude and in phase, magnified by m. This means that a laser beam with diameter $D_1$ and radius of curvature $S_1$ at the first relay plane is reproduced with diameter $D_2 = mD_1$ and radius of curvature $S_1 = m^2 S_1$ at the second relay plane. This type of optical relay has commonly been used in long linear laser amplifiers, where optical relays are used to image the laser beam between successive amplifiers and to maintain the spatial profile of the laser beam at the input of the amplifier throughout the entire amplifier chain.

An important feature of this invention is the use of the optical relay inside a laser resonator to control the ratio of the beam diameters in two components inside the resonator. In particular, for a laser with internal SHG, the nonlinear crystal is placed at one relay plane, and the laser rod is placed at the other relay plane. The diameter of the laser rod determines the aperture in the laser and hence the multi-mode diameter of the beam in the laser rod. The optical relay now images the beam from the laser rod to the nonlinear crystal to produce a beam demagnified by m, the optical relay magnification, in the nonlinear crystal. The ratio of the beam diameters in the laser rod and nonlinear crystal are fixed by the focal lengths of the lenses in the optical relay and does not depend on any other components in the laser resonator.

Figure 5:
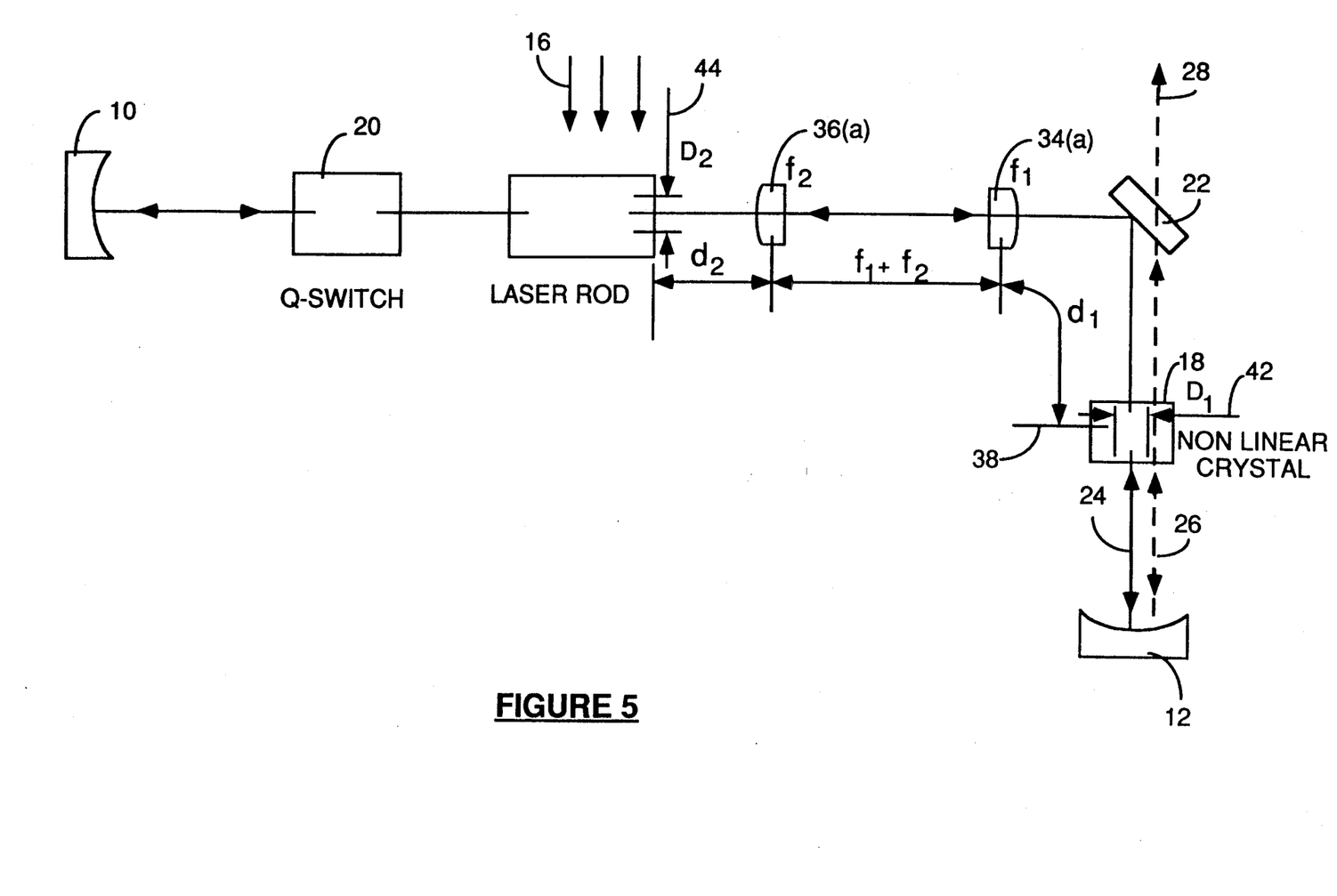
FIG. 5 is a schematic of a laser apparatus for SHG with a two lens internal relay and a folded resonator for output coupling of the second harmonic.

FIG. 5 shows the implementation of the optical relay inside a laser resonator in accordance with my invention. The laser rod 14 is positioned such that the face of the rod pointing towards the nonlinear crystal 18 is on the second relay plane 40 and the nonlinear crystal 18 is centered on the first relay plane 38. With the first relay lens 34(a) and second relay lens 36(a) positioned as shown, the ratio of the beam diameters in the laser rod $D_2$ and nonlinear crystal $D_1$ is $D_2/D_1 = f_2/f_1 = m$. Given the rod diameter, the relay lenses can now be chosen to give the desired beam diameter in the nonlinear crystal 18. The folding mirror 22 provides a means of output coupling for the second harmonic wavelength by making this mirror highly reflecting for the fundamental wavelength and highly transmitting for the second harmonic wavelength. The radii of curvature of the first mirror 10 and second mirror 12, as well as the positions of these mirrors, are chosen to determine the range of stability of the resonator as the thermal focal length of the laser rod changes, but they do not affect the ratio of the multimode beam diameters in the laser rod and the nonlinear crystal.

Figure 6:
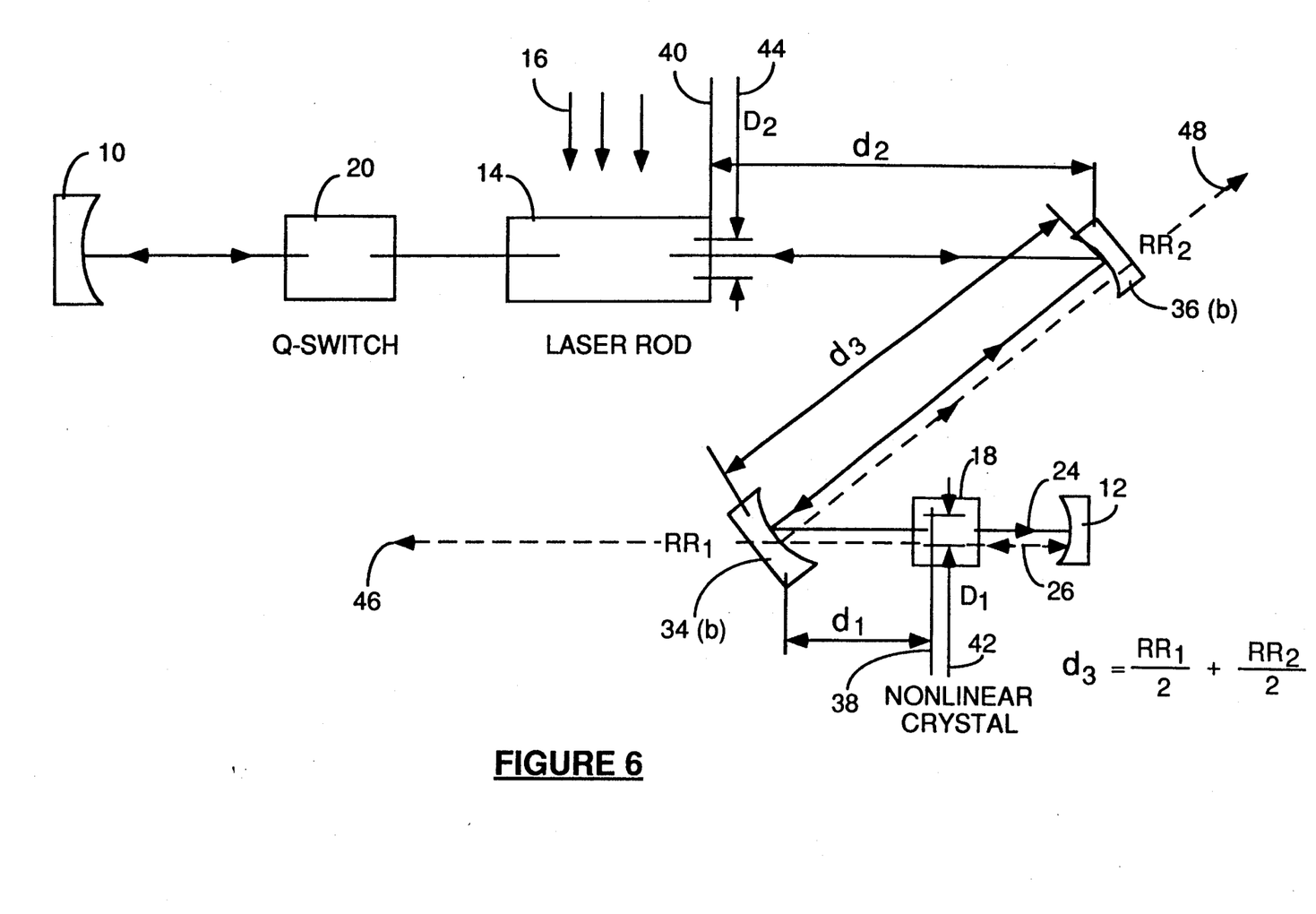
FIG. 6 is a schematic of a laser apparatus for SHG with a two mirror relay and with either relay mirror also providing output coupling for the second harmonic.

The preferred embodiment of my invention is shown in FIG. 6. Here the relay lenses have been replaced by curved mirrors 34b and 36b. The first relay mirror 34b has a radius of curvature $RR_1$ such that $RR_1 = 2f_1$ and the second relay mirror 36b has a radius of curvature $RR_1$ such that $RR_2 = 2f_2$. The spacing of the relay mirrors is $RR_1/2 + RR_2/2$. The advantage of using mirrors as relay elements is that the mirrors usually have lower insertion loss than lenses. Also, the mirrors cause no ghost reflections and ghost focusing in the laser, and either of the relay mirrors can be used as a means of output coupling to produce an external second harmonic beam 46 through the first relay mirror 34b or an external second harmonic beam 48 through the second relay mirror 36b. In the first case, the first relay mirror 34b is highly reflecting at the fundamental wavelength and highly transmitting at the second harmonic wavelength to produce the second harmonic output beam 46. The second relay mirror 36b is highly reflecting at both wavelengths. In the second case, the first relay mirror 34b is highly reflecting at both wavelengths and the second relay mirror 36b is highly reflecting at the fundamental wavelength and highly transmitting at the second harmonic wavelength to produce the second harmonic output beam 48.

In one particular embodiment of this invention, the radius of curvature of the first relay mirror is 20 cm and the radius of curvature of the second relay mirror is 50 cm. The mirrors are separated by 35 cm, and the relay magnification is 2.5. For an Nd:YAG with diameter 4 mm, the spotsize in the KTP nonlinear crystal is 1.6 mm. The resonator is completed with a flat first mirror 10 positioned 17 cm from the Nd:YAG rod and a second mirror 12 with radius of curvature 10 cm positioned 10 cm from the KTP nonlinear crystal. This laser is repetitively Q-switched at 25 kH and reliably produces more than 24 watts of output power at the second harmonic.

To further illuminate the differences between the single lens resonators in FIGS. 2 and 3 and the resonators with an optical relay in FIGS. 5 and 6, the results of the stability analysis of each type of resonator will be presented. Generally, in this analyses it is assumed that a lowest order or $TEM_{00}$ mode exist for the laser resonator. The spotsize of this mode is determined by propagating this mode once back and forth through the resonator and requiring the $TEM_{00}$ mode after one round-trip to be identical in amplitude and phase of the $TEM_{00}$ mode at the start. If such a mode does not exist, the resonator is considered unstable. If such a mode does exist, the spotsizes in the laser rod and the nonlinear crystal can be determined. Also, if a $TEM_{00}$ mode exists, then higher order modes exist, and these modes have larger diameters than the $TEM_{00}$ mode. In general, enough high order modes will oscillate in the laser resonator until the total multi-mode beamsize approximately fills the aperture in the laser. This aperture is usually determined by the diameter of the laser rod. In the resonator analysis we can determine how many modes are required to fill the aperture, and in the analysis of this resonator we define a mode multiplier M, where $$M = \frac{\text{laser rod aperture diameter}}{\text{radius of } TEM_{00} \text{ mode in laser rod}}$$

Once this mode multiplier M has been determined, the multi-mode spotsize can be determined anywhere in the resonator by determining the $TEM_{00}$ mode radius at that position, and multiplying it by M. This is how the multi-mode diameter is determined in the nonlinear crystal. In the analysis of the resonators in FIGS. 2, 3, 5 and 6, it is useful to determine the mode multiplier and multi-mode beam diameter in the nonlinear crystal, particularly as a function of the thermal focusing of the laser rod. Here the back focal length (BFL) is a convenient measure of the thermal focusing of the laser rod. Typical values of the BFL of the Nd:YAG rod when it is pumped by a cw Krypton arc lamp, can be shorter than 15 cm at full power of the arc lamp. Over the typical operating range of lamp currents, the BFL varies from <15 cm at full current to >40 cm at lower currents and stable operation of the laser resonator is required over this range.

Figure 7:
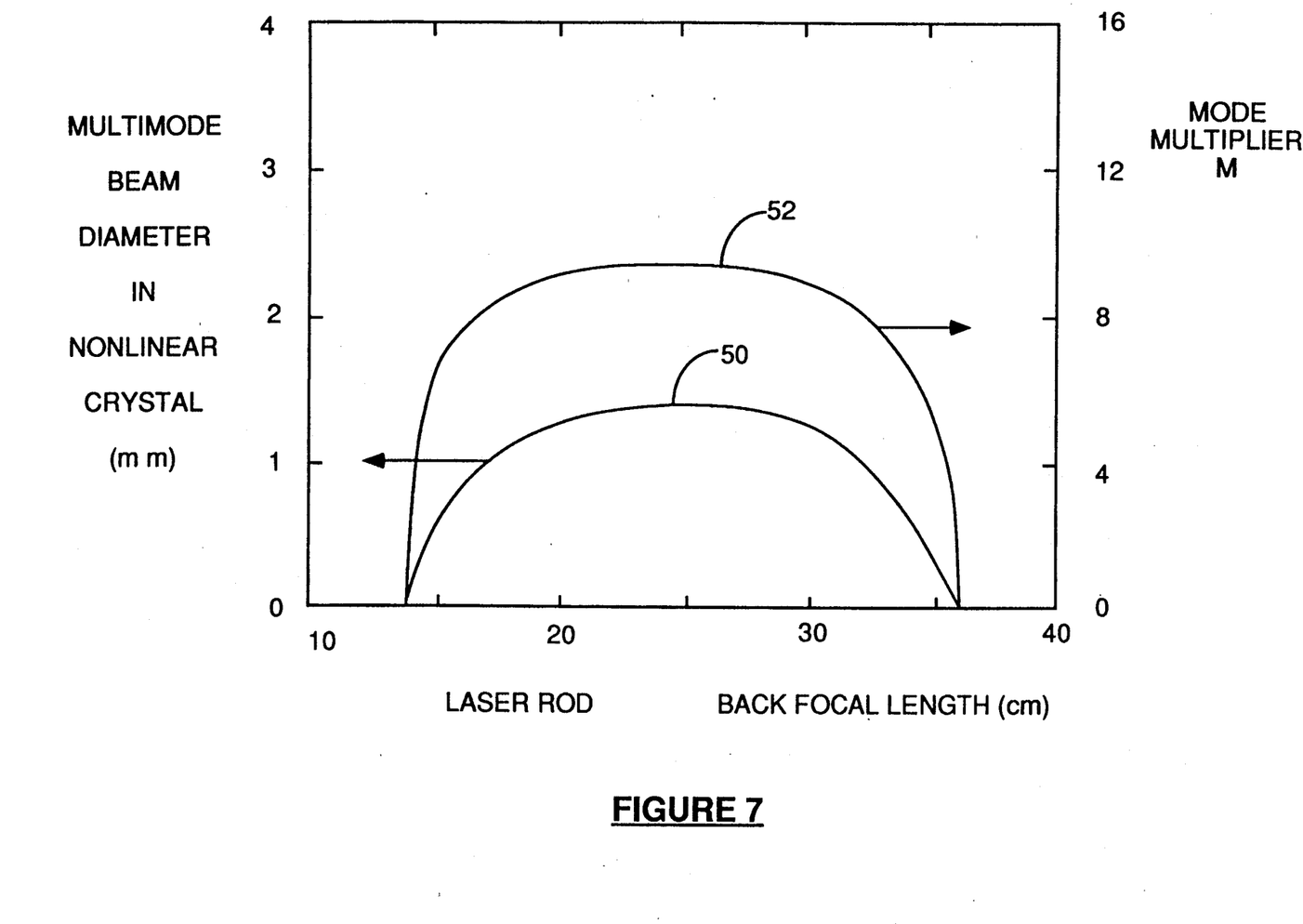
FIG. 7 is the stability diagram for the type of resonator in FIGS. 2 and 3.

The results of this type of analysis for a typical laser with a single internal lens is shown in FIG. 7. The curve of multi-mode beam diameter in the nonlinear crystal 40 shows that the beam diameter gets very small at short BFL and long BFL. The small beam diameters at the long BFL is no real problem because the laser power is also low and no damage is done in the laser. However, the beam diameter collapse at short BFL and high power is a major problem. In these lasers great care has to be taken that the lamp current is not turned up too high, because the resulting high power density at the fundamental wavelength in the nonlinear crystal can damage the crystal. With typical variations in Nd:YAG rod focusing characteristics and variations in other laser components, this becomes a severe problem. FIG. 7 also shows the plot of the mode multiplier M as a function of the laser rod BFL 52. This shows that as the beam diameter in the nonlinear crystal gets smaller, the mode multiplier M gets smaller at the same time, or from the previous equation for M, the $TEM_{00}$ spotsize in the laser rod gets larger. The real limit of stability as the $TEM_{00}$ spotsize in the laser rods gets larger is when the $TEM_{00}$ beam radius approaches the rod radius or M approaches the value of 2. This criteria sets the practical limits of stability for the resonator.

Figure 8:
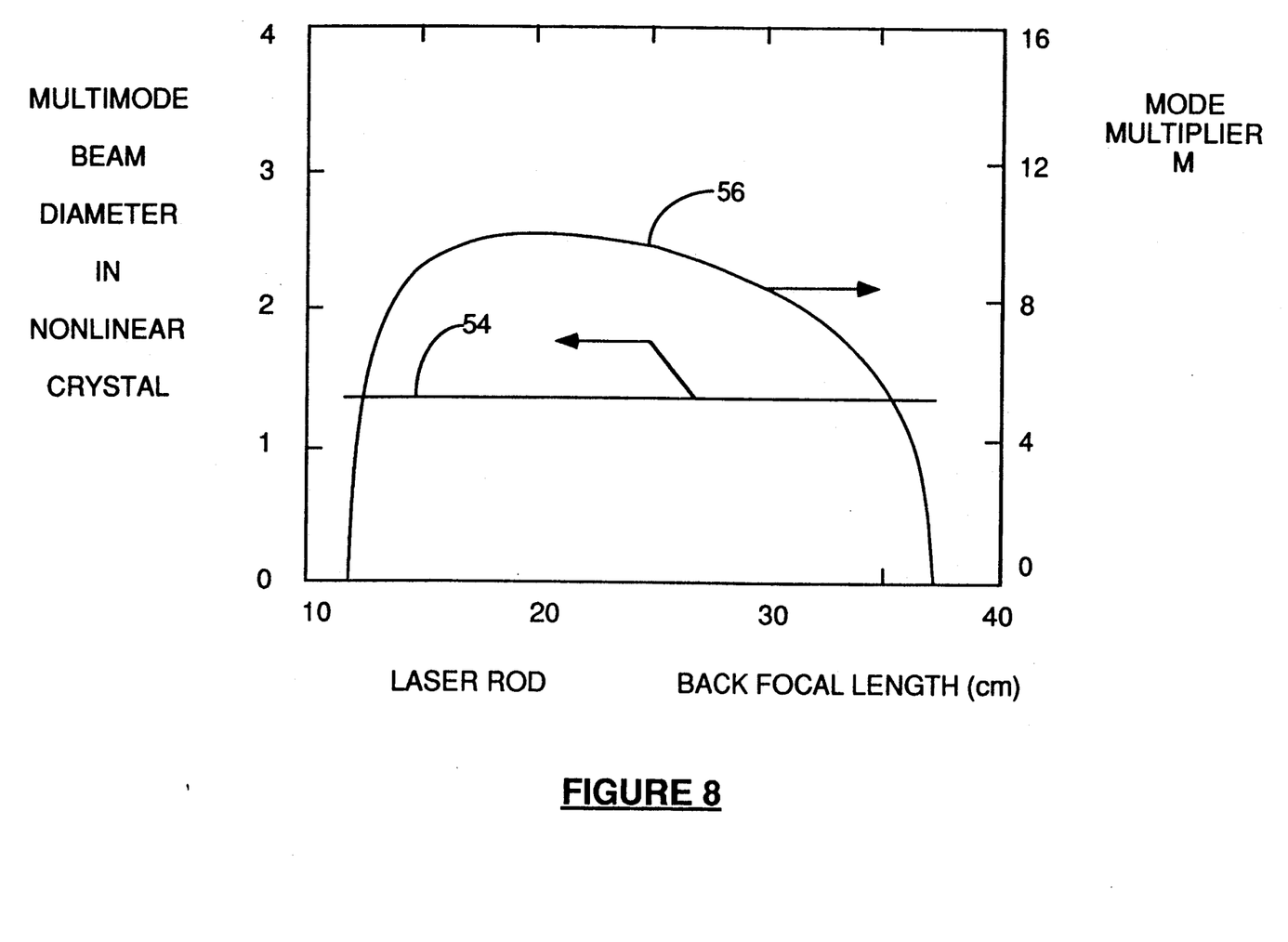
FIG. 8 is the stability diagram for the type of resonator in FIGS. 6 and 7.

FIG. 8 shows the results of the same analysis for the resonator with the optical relay. The plot of beam diameter in the nonlinear crystal 54 is a straight line as expected. This shows the real advantage of this invention. As the lamp current is increased, the multi-mode beam diameter in the nonlinear crystal cannot collapse. Hence in practice in this laser, the lamp current can be increased with no fear of damage in the nonlinear crystal due to a small beam diameter. This in particular helps to make this type of resonator and laser a real and practical instrument. The range of stability of this resonator is now indicated by the plot of the mode multiplier M as a function of BFL 56. This still shows that the mode multiplier goes to small values at the limits of stability, but the multi-mode beam diameter in the nonlinear crystal does not collapse. Even when the lamp current is increased and the laser rod BFL goes beyond the limit of stability of the resonator, the beam diameter for the unstable resonator modes in the nonlinear crystal will still be the same value. Through the optical relay, the beam diameter in the nonlinear crystal is locked to the laser rod aperture and cannot collapse, and the beam diameter in the nonlinear crystal is determined by a simple choice of two focal lengths (or ratio of curvature) for the optical relay elements.

The exact range of stability of the laser in FIG. 6 with an optical relay is determined by the curvature and position of the first mirror 10 and second mirror 12. Analysis further shows that the stability curve for this resonator remains a single, continuous curve. In contrast, for the single lens resonator in FIG. 3, for certain choices of radii of curvature and positions of the first mirror 10 and the second mirror 12, the stability curve can split up into two separate lobes, with a region of unstable operation within the range of the normal operation for the BFL of the laser. This makes the design of the single lens resonator even more difficult.

There is one more difference between these resonators that we have to consider. The optical relay in the resonators ensures that the beam profiles in the laser rod and nonlinear crystal are the same. As the beam propagates back and forth through the laser rod, the aperture formed by the rod will cut off the edges of the beam and tend to produce a more rectangular spatial profile of the beam in the rod. The optical relay will exactly then reproduce this beam profile in the nonlinear crystal. If there are any local high amplitude areas or hot spots on the beam, the second harmonic generation process will tend to reduce these hot spots, because at these hotspots the second harmonic generation efficiency is higher and this will tend to smooth out the beam profile. This beam profile is then relayed to the laser rod and there gain saturation will further tend to reduce the hot spots. This means that for the resonator with the optical relay, diffraction from the hard aperture will not produce high amplitude peaks in the nonlinear crystal, and SHG and gain saturation will cooperate to smooth out the spatial profile of the beam. This all reduces the risk of hot spots on the beam in the nonlinear crystal and this reduces the risk of optical damage to the nonlinear crystal. In the single-lens resonator, the situation is quite different. The nonlinear crystal is close to the focal plane of the lens, and now the spatial profile in the nonlinear crystal is close to being the Fourier transform of the spatial profile in the laser rod. Under these circumstances, any clipping of the beam due to the hard aperture of the laser rod will cause spatial modulation on the beam in the nonlinear crystal. Also, any smoothing out of the beam due to SHG will not be reproduced in the laser rod. Smoothing of the beam due to gain saturation also will not be reproduced in the nonlinear crystal, and in general these two processes will not cooperate to smooth out the spatial profile of the beam in the nonlinear crystal. Hence, the risk of damage of the nonlinear crystal is higher. Thus, in addition to controlling the beam diameter in the nonlinear crystal, the optical relay will also produce a smoother spatial profile of the beam in the nonlinear crystal than a single lens resonator.

Figure 9:
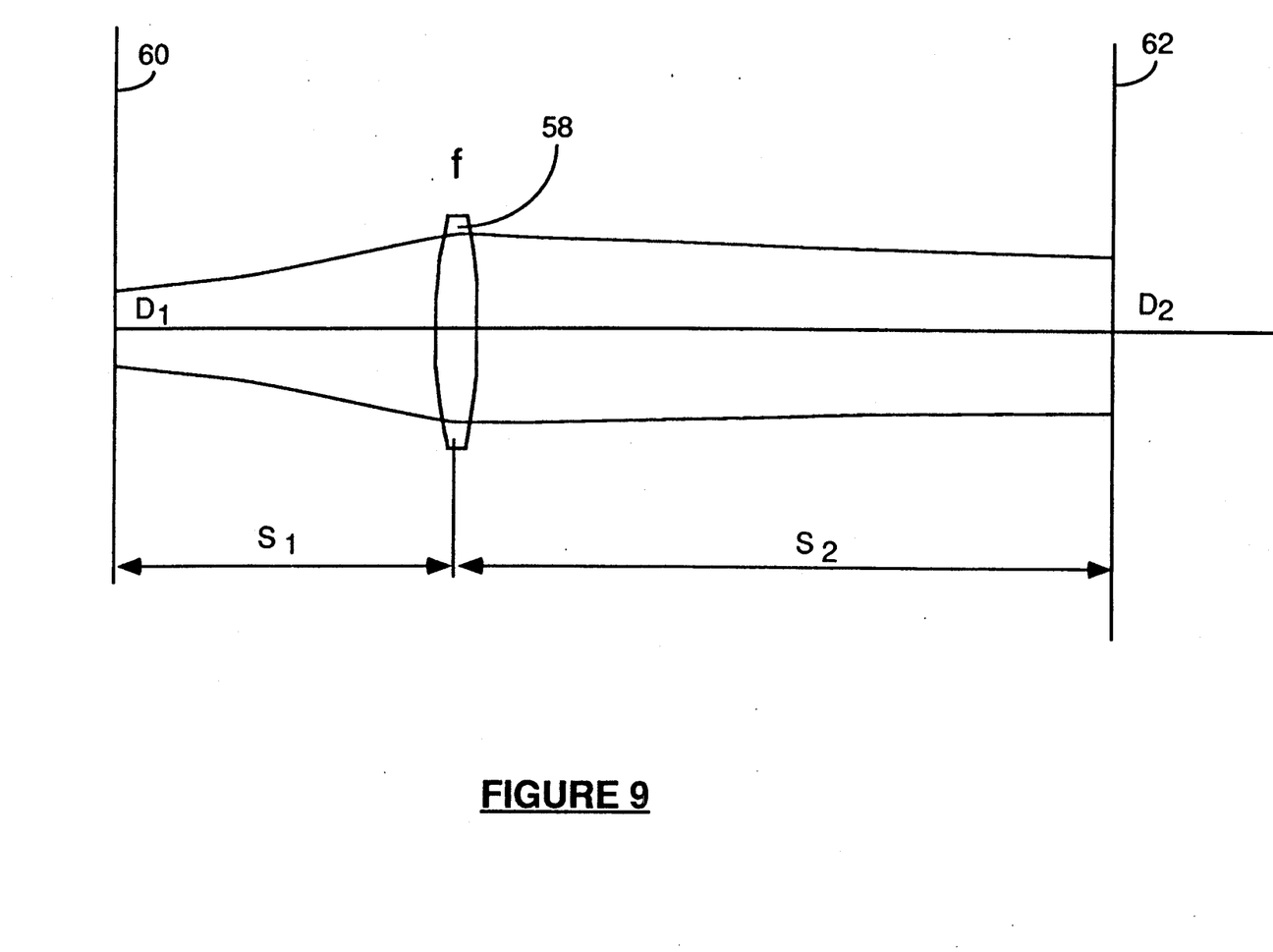
FIG. 9 is a schematic of the focusing properties of a single lens.

The question that now arises is whether the two-lens relay is the only way to accomplish the control of the beam diameter in the nonlinear crystal. Is it possible to use a single lens and place the laser crystal and nonlinear crystal in the conjugate planes of the lens? FIG. 9 shows a single lens 58 and the first conjugate plane 60 and second conjugate plane 62. These planes are also known as the object and image planes. They are related by:

$$1/S_1 + 1/S_2 = 1/f$$

The magnification is $m = S_2/S_1$ and the ratio of the beam diameter $D_2/D_1 = m$. The laser rod is placed at the second conjugate plane, and the nonlinear crystal is placed at the first conjugate plane. Analysis shows that this structure does not behave the same as the two-lens relay. Generally, the amplitude of any light distribution at the first conjugate plane is reproduced exactly at the second conjugate plane, but the phase distribution is not reproduced. This can be understood better if the ray matrices for the optical relay and the single lens are considered. These ray matrices are explained in a book by A. E. Siegman, *An Introduction to Lasers and Masers*, McGraw-Hill, 1971, pp. 294–328. The ray matrix for the two-lens relay from the first relay plane to the second relay plan is given by $$M(\text{relay}) = \begin{vmatrix} -m & 0 \\ 0 & -1/m \end{vmatrix}$$

ratio of the radii of curvature is $R_2/R_1 = m^2$, as stated before. The ray matrix for a single lens from the first to the second conjugate is given by $$M(\text{single lens}) = \begin{vmatrix} -m & 0 \\ -1/f & -1/m \end{vmatrix}$$

Figure 10:
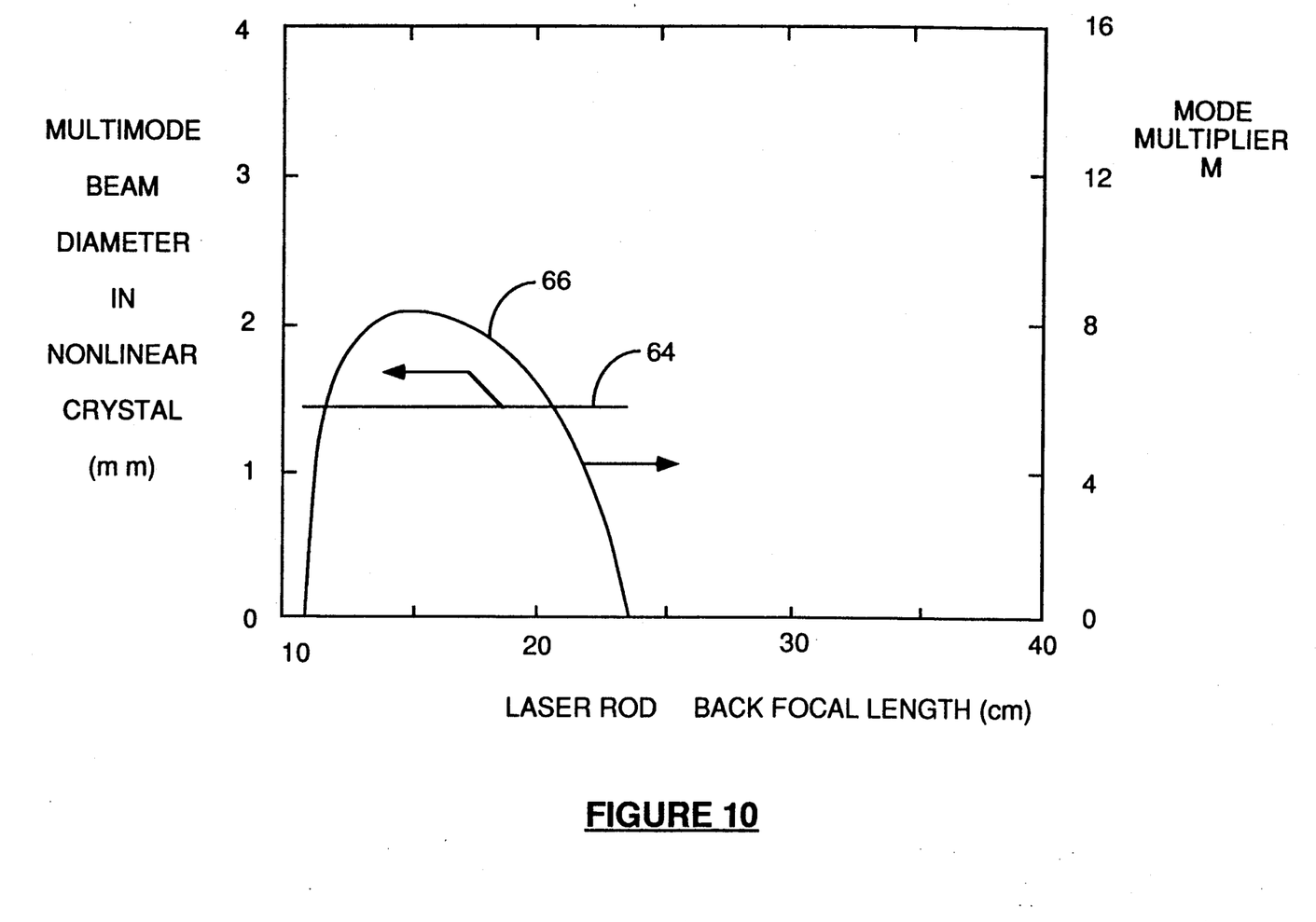
FIG. 10 is the stability diagram of the type of resonator in FIG. 2, but with the laser rod and nonlinear crystal placed at the conjugate planes of the single lens.

The off-diagonal term $-1/f$ suggests that a transformation by the single lens does not preserve phase. It can be shown that the ratio of the beam diameters at the conjugate planes is given by $D_2/D_1 = m$, but if $RL_2$ is the radius of curvature of the second conjugate plane, and $RL_1$ is the radius of curvature at the first conjugate plane, they are related as follows:

$$1/RL_2 = 1/(m^2 RL_1) + 1/(m f)$$

and this clearly shows the change in beam radius of curvature at the second conjugate plane. When the complete stability analysis of a single lens resonator with the elements at the conjugate planes is done, results as shown in FIG. 10 are obtained. Curve 64 shows the beam diameter as a function of BFL of the laser rod, and indeed is independent of BFL as expected. Curve 66 shows the mode multiplier as a function of BFL and this shows the stability limit of the single-lens resonator. This clearly shows that the stability curve is now very narrow and is centered on a very short BFL. This type of resonator would only be stable for a very narrow range of lamp currents very close to the maximum lamp current for a typical laser. This would not be very practical, but it does show that a special case of the single lens resonator does indeed behave like a two-lens relay.

Figure 11:
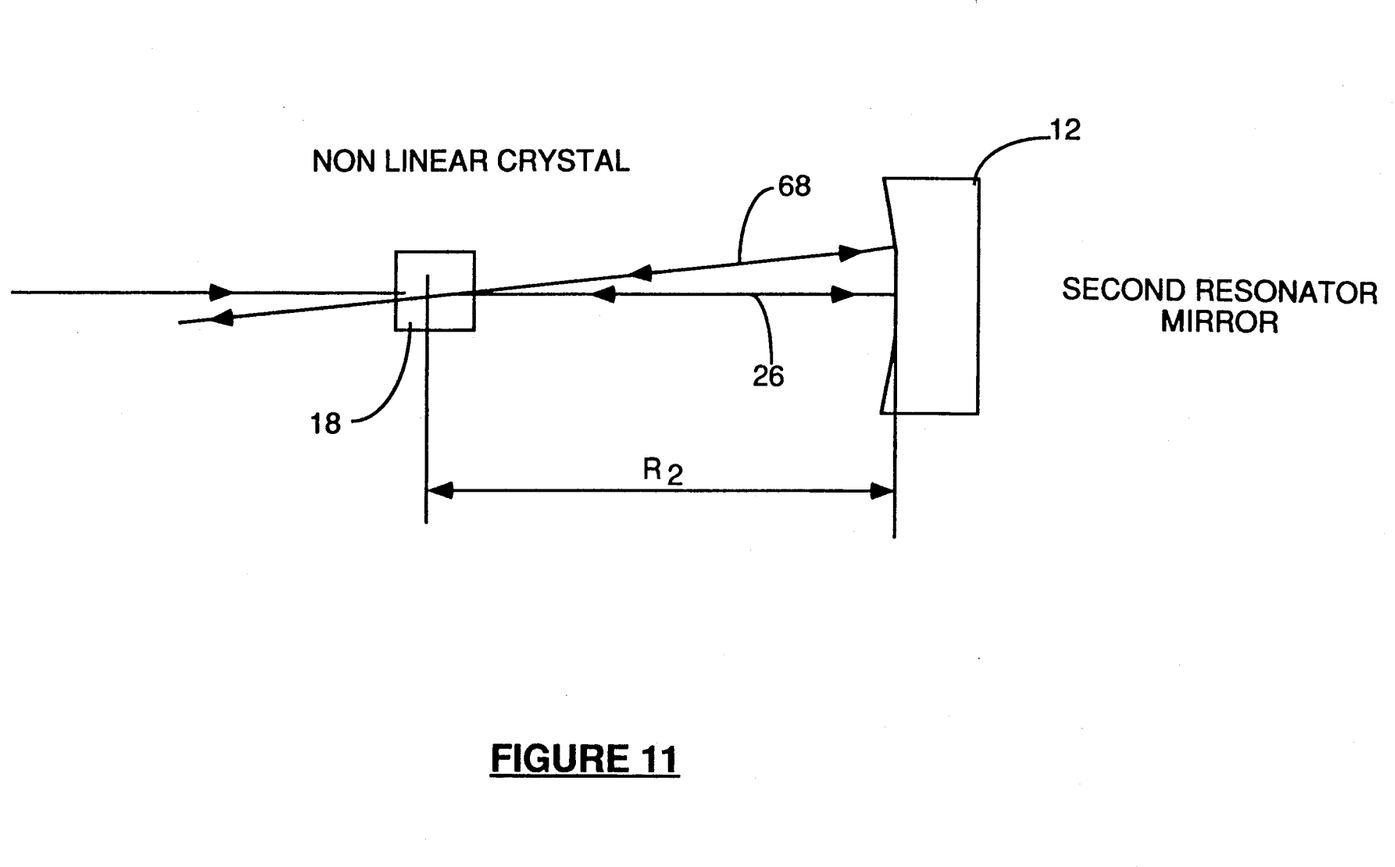
FIG. 11 is a schematic of the placement of the second resonator mirror to avoid stray beams from hitting the structure around the nonlinear crystal.

Finally, the placement of the second mirror has to be considered. FIG. 11 shows the case where the second resonator mirror 12 with radius of curvature $R_2$ is positioned distance $R_2$ away from the nonlinear crystal 18. The fundamental beam 26 passes back and forth through the nonlinear crystal, and if the AR coatings of the nonlinear crystal are not perfect, a stray beam 68 is reflected off the nonlinear crystal. Usually the face of the nonlinear crystal 18 is not quite normal to the beam in the resonator and the reflected beam 68 goes out of the resonator beam path. It can happen that this stray beam reflects off the second resonator mirror 12 and hits the mount surrounding the nonlinear crystal. The power in this stray beam can be sufficient to heat up the holder around the nonlinear crystal and change the temperature of the crystal and cause the nonlinear crystal not to be phase matched for SHG. This reduces SHG output of the laser. However, in the special case where the nonlinear crystal 18 is placed at the radius of curvature of the second resonator mirror 12, the stray beam goes back through the nonlinear crystal and produces no problem for the nonlinear crystal. It is clear from the previous description that the optical relay inside a laser resonator has several advantages. It determines the ratio of the beam diameters in the laser rod and nonlinear crystal in a way that is easy to design and implement. It also makes the beam diameter in the rod independent of the thermal focusing in the laser rod and other resonator parameters. The optical relay further helps to reduce hot spots on the beam in the nonlinear crystal. All this helps to prevent optical damage to the nonlinear crystal. Finally, the second resonator mirror can also be placed to prevent stray beams from hitting the nonlinear crystal mount and changing the temperature of the nonlinear crystal.

However, in general the advantages of the optical relay inside a laser resonator are not limited to the above. In the most general case, the optical relay can be used to control the ratio of the beam diameters between any two elements in a laser resonator. The relay can also be useful where the beam profile in one part of the resonator has to be reproduced exactly in another part of the resonator.

The use of the optical relay inside the resonator is also not limited to second harmonic generation, but can generally be applied to any nonlinear process such as $N_{th}$ harmonic generation. Accordingly, the scope of the invention should be determined not by the previous discussions and illustrations, but by the following claims.

I claim:

1. A laser resonator system that comprises: a first and second mirror forming an optical resonator, where said first and second mirrors have radii of curvature R1 and R2 respectively; a laser medium positioned within said optical resonator wherein said laser medium provides gain to a beam of electromagnetic radiation at a certain wavelength, referred to as the fundamental wavelength, said beam at the fundamental wavelength having a diameter $D_2$ after it passes through said laser medium; an optical element positioned within said optical resonator said optical element being substantially transparent to said beam of electromagnetic radiation at the fundamental wavelength; a means for imaging, positioned between said laser medium and said optical element within said optical resonator, that accepts said beam of radiation with diameter $D_2$ from said laser medium and images said beam with diameter $D_2$ to a beam of radiation with diameter $d_1$ in said optical element such that the ratio of diameters $d_2/D_1$ depends only on the properties of said means of imaging and said ratio of diameters $D_2/D_1$ is independent of the position and radii of curvature of said first and second mirrors and is independent of any focusing properties of said laser medium or said optical element.

2. A laser resonator system according to claim 1, wherein said optical element is an optical medium that can convert said beam of electromagnetic radiation at the fundamental wavelength within said optical resonator to another wavelength.

3. A laser resonator system according to claim 2, wherein said optical medium is a nonlinear optical medium with means of generating optical harmonics of the fundamental wavelength such that a wavelength at the $N^{th}$ harmonic is equal to the fundamental wavelength divided by N, where N is an integer $\geq 2$.

4. A laser resonator system according to claim 3, wherein said nonlinear optical medium is a nonlinear crystal that generates a second harmonic wavelength and where said nonlinear crystal is drawn from a class of inorganic and organic crystals including $LiNbO_3$, $Ba_2NaNb_5O_{15}$, $LiIO_3$, KDP, KTP, and BBO.

5. A laser resonator system according to claim 1, wherein said laser medium is a solid state crystal rod and where the crystal rod is drawn from a class of crystals including Nd:YAG, ND:YLF, ruby, and alexandrite.

6. A laser resonator system according to claim 5, wherein the laser rod is pumped by an optical source to excite said laser medium such that said laser medium can provide gain at the fundamental wavelength, and were said optical pumping is also a means of heating the laser rod that, together with water cooling at a outside diameter of the laser rod, can induce thermal focusing in the laser rod.

7. A laser resonator system according to claim 6, wherein the laser rod has a diameter D which forms an aperture of diameter D, the diameter of the laser rod being a means of determining a diameter of a multi-transverse mode beam in the laser rod such that the beam diameter is substantially equal to the aperture diameter D.

8. A laser resonator system according to claim 1, wherein said means of imaging comprises a plurality of lenses at predetermined positions between said laser medium and said optical element.

9. A laser resonator system according to claim 1, wherein said means of imaging comprises an optical relay consisting of a first relay lens and a second relay lens with a focal length $f_1$ and a focal length $f_2$, respectively, and where the first relay lens with focal length $f_1$ is a distance $d_1$ from said optical element, the second relay lens with focal length $f_2$ is a distance $f_1+f_2$ from said first relay lens, and said laser medium is a distance $d_2$ from said second relay lens, and where said distance $d_1$ and $d_2$ are related by $$m\, d_1 + d_2/m = f_1 + f_2,$$

where $m = f_2/f_1$ and is the magnification of said optical relay, and where said optical relay is a means of accepting said beam of radiation with diameter $D_2$ from said laser medium and of imaging said beam with diameter $D_2$ to a beam of radiation with diameter $D_1$ in said optical element and where said ratio of diameters $D_2/D_1$ is equal only to m, the magnification of said optical relay.

10. A laser resonator system according to claim 9 wherein the first relay lens and the second relay lens are replaced by two curved mirrors, where a first relay mirror with radius of curvature $RR_1$ replaces the first relay lens and $RR_1 = 2f_1$, and were a second relay mirror with radius of curvature $RR_2$ replaces the said second relay lens and $RR_2 = 2f_2$, and where said first relay mirror and said second relay mirror are positioned in the optical resonator in the same positions as the first and second relay lens, respectively.

11. A laser resonator system according to claim 10 wherein the angle of incidence of said beam with diameter $D_2$ on said first and second relay mirrors is small and where said angle of incidence is less than approximately -10 degrees and were the imaging properties of said first and said second relay mirrors are substantially equal to the imaging properties of the first and second relay lenses.

12. A laser resonator system according to claim 10, where said first relay mirror is highly reflecting at the fundamental wavelength and highly transmitting at a second harmonic wavelength and where said first relay mirror provides a means of output coupling for said beam at the second harmonic wavelength.

13. A laser resonator system according to claim 10, where said first relay mirror is highly reflecting at the fundamental and second harmonic wavelengths, and said second relay mirror is highly reflecting at the fundamental wavelength and highly transmitting at the second harmonic wavelength and where said second relay mirrors provides a means of output coupling for said beam at the second harmonic wavelength.

14. A laser resonator system according to claim 1, wherein said means of imaging is a single lens of focal length f and where said single lens is positioned a distance $S_1$ from said optical element and a distance $S_2$ from said laser medium and where said distances $S_1$ and $S_2$ are related by $1/S_1 + 1/S_2$ and where the magnification of said single lens means of imaging is $S_2/S_1$, and where said single lens is a means of accepting said beam of radiation with diameter $D_2$ from said laser medium and imaging said beam with diameter $D_2$ to said beam of radiation with diameter $D_2$ in said optical element and where said ratio of diameters $D_2/D_1$ is equal to $S_2/S_1$, the magnification of said single lens means of imaging.

15. A laser resonator system that comprises: a first resonator mirror and a second resonator mirror, said first resonator mirror and second resonator mirror being highly reflecting at a fundamental wavelength, said first resonator mirror and said second resonator mirror forming an optical resonator at said fundamental wavelength and said first resonator mirror and said second resonator mirror having radii of curvature $R_1$ and $R_2$ respectively; a solid state laser rod positioned within said optical resonator;

an optical source for pumping said laser rod to excite said laser rod and provide gain to a beam of electromagnetic radiation at said fundamental wavelength, where said optical source for pumping heats said laser rod thereby inducing thermal focusing in said laser rod; a nonlinear optical crystal positioned within said optical resonator for generating a second harmonic wavelength; an optical relay consisting of a first and a second relay mirror with radii of curvature $RR_1$ and $RR_2$, respectively, said first and second relay mirrors being positioned between said laser rod and said nonlinear crystal such that the first relay mirror with radius $RR_1$ is a distance $d_1$ from said nonlinear crystal, the second relay mirror with radius $RR_2$ is a distance $RR_1/2 + RR_2/2$ from the first relay mirror, and where a face of said laser medium is a distance $d_2$ from the second relay mirror and where said distances $d_1$ and $d_2$ are related by $$m\, d_1 + d_2/m = RR_1/2 + RR_2/2,$$

where $m = RR_2/RR_1$ and is the magnification of said optical relay; an electromagnetic beam of radiation with diameter $D_1$ in said nonlinear crystal and with diameter $D_2$ in said laser rod and where the ratio of the diameters $D_2/D_1$ is completely determined by the properties of said optical relay such that $D_2/D_1 = m = RR_2/RR_1$ and where said ratio of diameters $D_2/D_1$ is independent of the radii of curvature $R_1$ and $R_2$ of said first and second resonator mirrors, and is independent of said thermal focusing in said laser rod; means for output coupling the second harmonic wavelength comprising said first relay mirror, said first relay mirror being highly reflecting at said fundamental wavelength and highly transmitting at the second harmonic wavelength; wherein the maximum output power at the second harmonic wavelength is obtained by choosing values of the radii of curvature of said first and said second relay mirrors such that said ratio of beam diameters $D_2/D_1$ will maximize the second harmonic output power for said laser rod and said nonlinear crystal.

16. A laser resonator system according to claim 15 wherein said optical relay comprises means for determining that a spatial profile of said beam of electromagnetic radiation in said laser medium is the same as the spatial profile in said nonlinear crystal and where effects of gain saturation in said laser medium and second harmonic generation in said nonlinear crystal cooperate to reduce any spatial non-uniformities and local high amplitude peaks or hot spots in said beam, said nonlinear crystal and said laser rod being protected from optical damage due to a reduction of said hot spots.

17. A laser resonator system according to claim 15 wherein said second resonator mirror is concave with a radius of curvature $R_2$ and is positioned a distance $d_2$ from said nonlinear crystal so that any stray reflections from said nonlinear crystal that will hit said second resonator mirror are reflected back through said nonlinear crystal and do not hit the structure surrounding said nonlinear crystal and consequently no unwanted heating of the area surrounding said nonlinear crystal and its surroundings can occur.

18. A laser resonator system according to claim 1, wherein said laser medium comprises a non-crystal rod and where the non-crystal rod is drawn from a class of materials including Nd:Glass.

19. A laser resonator system according to claim 18, including an optical source for exciting said non-crystal rod such that said non-crystal rod provides gain at the fundamental wavelength, and wherein said optical source pumps said non-crystal rod so as to heat said non-crystal rod such that thermal focusing is induced in said non-crystal rod.

20. A laser resonator system according to claim 19 including means for water cooling said non-crystal rod, said cooling of said non-crystal rod causing thermal focusing in said non-crystal rod.

21. A laser resonator system according to claim 19, wherein said non-crystal rod has a diameter D which forms an aperture of diameter D, the diameter of said non-crystal rod determining the diameter of a multi-transfer mode beam in said non-crystal rod such that the beam diameter is substantially equal to the aperture diameter D.

22. A laser resonator system according to claim 1 wherein said means of imaging is a plurality of lenses and curved mirrors at predetermined positions between said laser medium and said optical element.

23. A laser resonator system according to claim 1 wherein said means of imaging is a plurality of curved mirrors at predetermined positions between said laser medium and said optical element.

24. A laser resonator system that comprises:
- a first resonator mirror and a second resonator mirror, said first resonator mirror and second resonator mirror being highly reflecting at a fundamental wavelength, said first resonator mirror and said second resonator mirror forming an optical resonator at said fundamental wavelength and said first resonator mirror and said second resonator mirror having radii of curvature $R_1$ and $R_2$ respectively;
- a solid state laser rod positioned within said optical resonator;
- an optical source for pumping said laser rod to excite said laser rod and provide gain to a beam of electromagnetic radiation at the fundamental wavelength, where said optical source of pumping heats said laser rod thereby inducing thermal focusing in said laser rod;
- a nonlinear optical crystal positioned within said optical resonator for generating a second harmonic wavelength;
- an optical relay consisting of a first and a second relay mirror with radii of curvature $RR_1$ and $RR_2$, respectively, said first and second relay mirrors being positioned between said laser rod and said nonlinear crystal such that the first relay mirror with radius $RR_1$ is a distance $d_1$ from said nonlinear crystal, the second relay mirror with radius $Rr_2$ is a distance $RR_1/2 + RR_2/2$ from the first relay mirror, and where a face of said laser medium is a distance $d_2$ from the second relay mirror and where said distances $d_1$ and $d_2$ are related by $$m\, d_1 + d_2/m = RR_1/2 + RR_2/2,$$

where $m = RR_2$ and is the magnification of said optical relay;
- an electromagnetic beam of radiation with diameter $D_1$ in said nonlinear crystal and with diameter $D_2$ in said laser rod and where the ratio of the diameters $D_2/D_1$ is completely determined by the properties of said optical relay such that $D_2/D_1 = m = RR_2/RR_1$ and where said ratio of diameters $D_2/D_1$ is independent of the radii of curvature $R_1$ and $R_2$ of said first and second resonator mirrors, and is independent of said thermal focusing in said laser rod; and
- means for output coupling the second harmonic wavelength provided by said second relay mirror wherein said first relay mirror is highly reflecting at both the fundamental wavelength and the second harmonic wavelength, and said second relay mirror is highly reflecting at the fundamental wavelength and highly transmitting at the second harmonic wavelength;
- wherein maximum output power is obtained at the second harmonic wavelength by choosing values of the radii of curvature of said first and said second relay mirrors such that said ratio of beam diameters $D_2/D_1$ will maximize the second harmonic output power for said laser rod and said nonlinear crystal.

* * * * *